United States Patent
Singhal (10) Patent No.: US 8,240,429 B1
(45) Date of Patent: Aug. 14, 2012

(54) SYSTEM METHOD AND DEVICES FOR WINDAGE NOISE DAMPING IN INDUCTION MOTOR

(75) Inventor: Sumit Singhal, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/031,473

(22) Filed: Feb. 21, 2011

(51) Int. Cl.
  *E04F 17/04* (2006.01)
(52) U.S. Cl. ......... 181/224; 181/225; 181/212; 181/214
(58) Field of Classification Search .......... 181/212, 181/214, 224, 225
  See application file for complete search history.

(56) References Cited

U.S. PATENT DOCUMENTS

| | | | |
|---|---|---|---|
| 1,865,677 A * | 7/1932 | Cheyney | 454/370 |
| 2,150,811 A * | 3/1939 | Starkweather et al. | 181/266 |
| 2,176,615 A * | 10/1939 | Starkweather et al. | 181/250 |
| 3,947,148 A * | 3/1976 | Holt | 415/119 |
| 4,050,913 A * | 9/1977 | Roach | 96/381 |
| 4,266,602 A * | 5/1981 | White et al. | 165/124 |
| 4,316,522 A * | 2/1982 | Hirschorn | 181/224 |
| 5,260,523 A * | 11/1993 | Pettersson et al. | 181/224 |
| 5,326,317 A * | 7/1994 | Ishizu et al. | 454/354 |
| 5,728,979 A * | 3/1998 | Yazici et al. | 181/224 |
| 5,728,980 A * | 3/1998 | Zarnick | 181/224 |
| 5,979,595 A * | 11/1999 | Harris | 181/214 |
| 6,342,005 B1 * | 1/2002 | Daniels et al. | 454/338 |
| 6,945,355 B2 * | 9/2005 | Ludwig et al. | 181/224 |
| 2003/0221904 A1* | 12/2003 | Ludwig et al. | 181/224 |
| 2006/0272886 A1* | 12/2006 | Mueller | 181/224 |
| 2008/0230305 A1* | 9/2008 | Goto et al. | 181/224 |
| 2009/0235879 A1* | 9/2009 | Ikeda et al. | 123/41.49 |
| 2011/0061968 A1* | 3/2011 | Helenius et al. | 181/224 |

* cited by examiner

Primary Examiner — Forrest M Phillips (57) ABSTRACT

A rotor windage noise damping system for an induction motor cooling vent A duct having a duct airflow path has a proximal end opening in communication with the cooling vent and the distal end opening is for communication with ambient air. The duct includes a plurality of baffles. The baffles are oriented in a generally parallel mutually spaced symmetrical or asymmetrical array relative to each other and the duct airflow path. Dimensions for baffle array symmetry or asymmetry, parallel spacing, baffle thickness and baffle inset from one of the duct openings are chosen to restrict distance between adjacent baffles to less than a wavelength of windage noise at selected propagation frequencies, yet provide for sufficient cooling airflow through the duct. The duct may be tuned to dampen selected propagation frequencies by changing the baffle array.

22 Claims, 6 Drawing Sheets

SYSTEM METHOD AND DEVICES FOR WINDAGE NOISE DAMPING IN INDUCTION MOTOR

BACKGROUND OF THE DISCLOSURE

1. Field of the Invention

The invention relates to noise reduction. systems for induction motors, and more particularly baffled ducts that may be fitted to motor cooling vents in order to dampen windage noise propagation caused by rotating motor shafts and rotors.

2. Description of the Prior Art

Operating induction motors generate windage noise, caused by the rotating shaft, rotor and related rotating hardware. The windage noise propagates through motor cooling airflow paths that provide a heat transfer path out of the motor housing, including any external shrouds or other motor enclosures, via housing cooling vents. While the motor housing frame, external shrouds and other enclosures absorb or deaden some windage noise, the housing cooling vents enable noise propagation directly to surrounding ambient air. It is desirable to minimize noise exposure to workers who are located near operating motors, especially in the frequency range of 400-4000 Hz that has a greater impact on human hearing than higher or lower frequencies.

Known ways to minimize windage noise propagation from induction motors have included sound-deadening shrouds or other enclosures that surround the motor and become part of the motor housing. However, it is impractical to shroud larger motors of greater than 1000 horsepower due to their large size. In another known solution, motor housing cooling vents have been coupled to sound dampening ducts having generally parallel planar baffles of identical thickness and lateral spacing that are oriented parallel to the duct cooling airflow path. Lateral spacing of adjacent baffle plates less than the sound propagation wavelength of a given windage noise propagation frequency dampens the noise. While such identical baffle constructions dampen some relevant low frequency (large wavelength) noise, such known constructions do not provide noise dampening over a broad spectrum of noise frequencies. If such known baffle duct construction is modified to decrease spacing between baffles so as to dampen the relatively shorter wavelength of higher noise frequencies, overall cooling airflow performance of the cooling vent decreases to an unacceptable performance level. For example, adjacent baffle spacing of 5.5 inches (140 mm) is sufficient to dampen a 400 Hz noise frequency. Such relatively wide adjacent baffle spacing provides for sufficient air flow rate and volume into the motor cooling vent. However, a 4000 Hz noise frequency may require baffle parallel spacing of only 0.001 inch (0.028 mm) to dampen sufficiently that frequency. Laterally spacing all baffles with a gap of 0.001 inch would unduly restrict air flow into the motor cooling vent. Generally one skilled in the art would prefer a minimum baffle lateral spacing of no less than 0.5 inch (13 mm) to allow sufficient cooling air flow. Therefore uniformly spaced baffle dampers potentially sacrifice higher frequency noise attenuation when their shorter wavelengths pass between baffles set at the minimum baffle lateral spacing.

Also, known identical uniform baffle construction and spacing damping ducts provide a single solution for all applications, whereas different applications might benefit from baffle ducts constructed to meet the noise damping needs of a specific motor design or application for a motor design. Different motor constructions may have different noise propagation frequency signatures. Furthermore noise signatures may be changed by specific installations and field applications.

Thus, a need exists in the art for an induction motor noise reduction system capable of dampening a broad spectrum of windage noise frequencies propagating from motor cooling vents that does not unduly restrict cooling airflow to the motor.

Another need exists in the art for an induction motor noise reduction system capable of being tuned to dampen windage noise propagating from motor cooling vents of motors having differing noise propagation properties due to their specific construction traits or installation application.

SUMMARY OF THE INVENTION

Accordingly, an object of the present invention is to create an induction motor noise reduction system capable of dampening windage noise propagating from motor cooling vents that does not unduly restrict cooling airflow to the motor.

Another object of the present invention is to create an induction motor noise reduction system capable of being tuned to dampen windage noise propagating from motor cooling vents of motors having differing noise propagation properties due to their specific construction traits or installation application.

These and other objects are achieved by the induction motor windage noise damping systems and methods of the present invention that provide for tunable symmetrical or asymmetrical arrays of baffles in a damping duct having a proximal end that is coupled to the motor in communication with a motor cooling vent and a distal end for communication with ambient air. The baffle arrays are constructed of generally parallel baffles. In the baffle array, baffle thickness, adjacent baffle lateral spacing and inset from one of the duct openings are chosen to restrict distance between adjacent baffles to less than a wavelength of windage noise at selected propagation frequencies. In this way, the damping duct is "tunable" to dampen specific noise frequencies of interest in different motor constructions and/or different specific motor field applications/installations. The damping duct baffle array may be selectively pre-configured during construction to meet the needs of a specific application. In other embodiments the baffle array may be configured or modified in the field to meet the specific noise attenuation needs of a particular field application.

The present invention features an induction motor windage noise damping system, comprising a motor having a housing, a cooling vent formed in the housing, a rotating shaft and rotor within the housing generating windage noise, and a cooling airflow path defined within the housing that is in communication with the cooling vent. The present invention has a duct having proximal and distal ends defining respective openings and a duct airflow path there between. The proximal end opening is in communication with the cooling vent and the distal end opening is for communication with ambient air. A plurality of baffles are oriented in an array in the duct. In some embodiments, a plurality of first baffles are in the duct, having a first thickness, and a plurality of second baffles are in the duct, having a second thickness. In such embodiments, the first and second baffles are oriented in an generally parallel mutually spaced array relative to each other and the duct airflow path. Dimensions for baffle array symmetry or asymmetry, parallel spacing, baffle thickness and baffle inset from the proximal and/or distal opening are chosen to restrict distance between adjacent baffles to less than a wavelength of windage noise at selected propagation frequencies. The damping duct of the present invention may be factory or repair shop installed on an induction motor, as part of a motor/duct packaged system.

Alternatively, the duct may provided alone as part of an induction motor damping system that is installed in the field or factory by a motor manufacturer or motor maintenance and repair facility. For such applications, the present invention noise damping duct is provided to a customer without a motor.

The present invention also provides a method for damping windage noise in an induction motor having a housing, a cooling vent formed in the housing, a rotating shaft and rotor within the housing generating windage noise, and a cooling airflow path defined within the housing that is in communication with the cooling vent. This method of the present invention is performed by providing a duct having proximal and distal ends defining respective openings and a duct airflow path there between, the proximal end opening for coupling to an induction motor and communication with a cooling vent thereof, and the distal end opening for communication with ambient air. This method is further performed by providing a plurality of baffles that are oriented in an array in the duct. In some embodiments the baffle array so provided includes a plurality of first baffles in the duct, having a first thickness; and a plurality of second baffles in the duct, having a second thickness. In such embodiments, the first and second baffles are selectively oriented in an generally parallel mutually spaced array relative to each other and the duct airflow path. Dimensions for baffle array symmetry or asymmetry, parallel spacing, baffle thickness and baffle inset from the proximal and/or distal opening are chosen to restrict distance between adjacent baffles to less than a wavelength of windage noise at selected propagation frequencies, yet provide for adequate cooling airflow through the damping duct.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in induction motor windage noise damping systems that can be selectively tuned to dampen noise frequencies of interest by varying a baffle array within a cooling duct that is coupled to a motor cooling vent. The systems and methods of the present invention can be installed on motors in the factory before deploying them to field locations, or they can be added to motors after they have been deployed.

Figure 1:
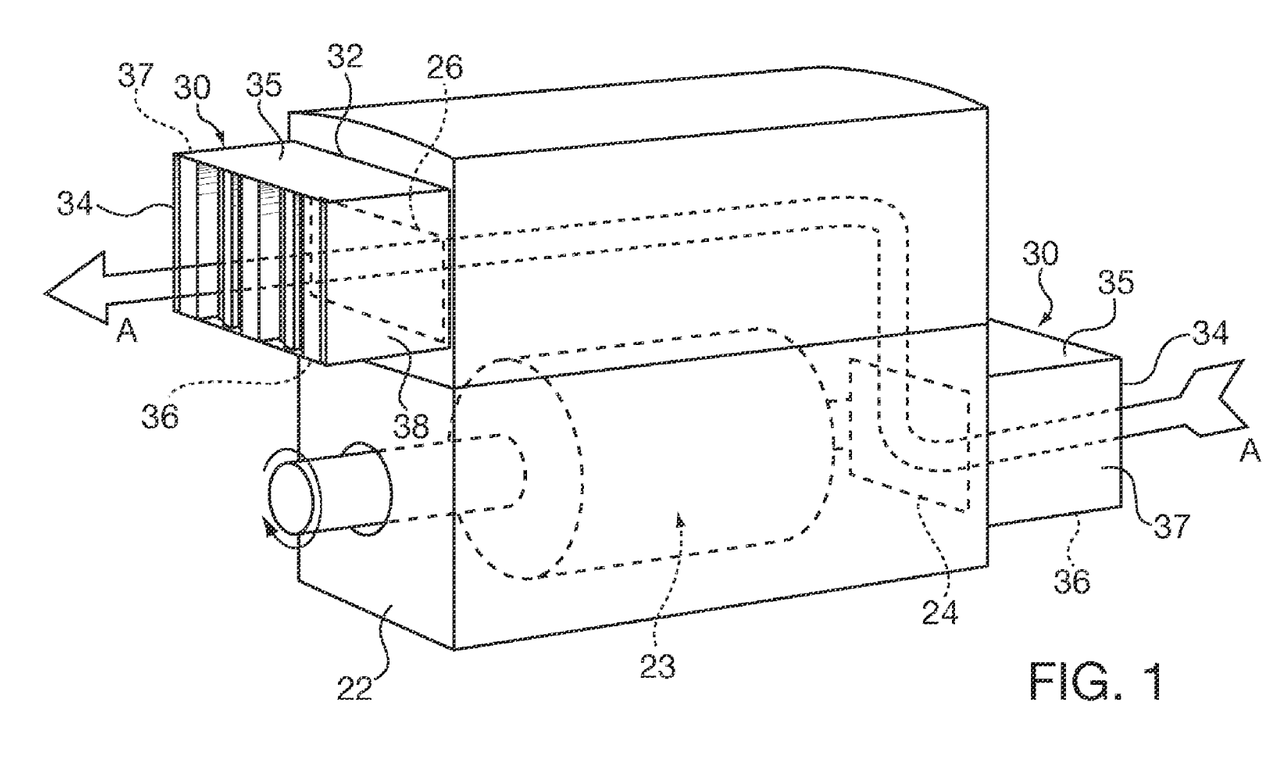
FIGS. 1 and 1A are schematic perspective views of an induction motor noise damping system of the present invention, including damping ducts each having an array of baffles.
Figure 1A:
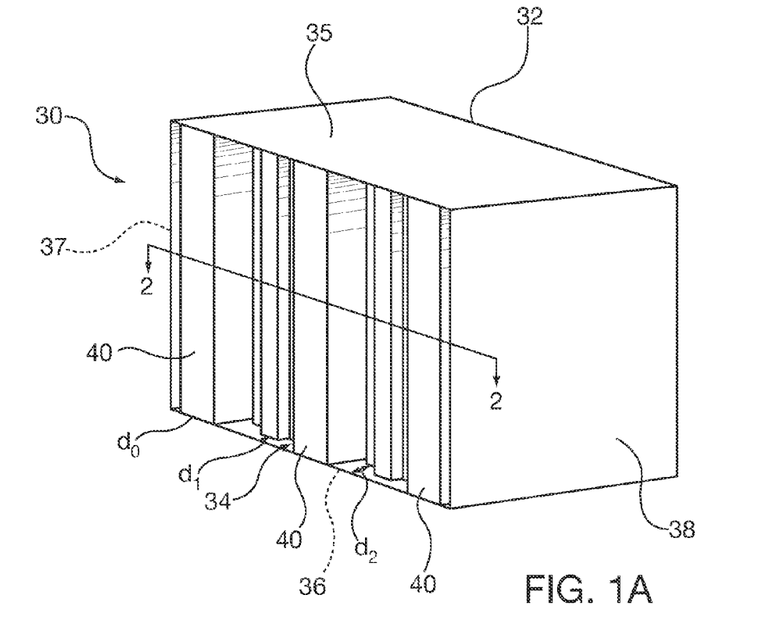

FIGS. 1 and 1A show the noise damping system of the present invention installed on an induction motor 20 of known design. Motor 20 is shown schematically, and includes a motor housing 22 with frame and related cooling air flow shrouding. Rotor 23 rotates on bearings within the housing, generating windage noise that propagates along the cooling airflow path A. Windage noise emanates from the motor housing 22 through cooling vent inlet 24 and outlet 25. For simplicity in describing and showing an embodiment of the present invention, a single cooling vent inlet 24, outlet 26 and cooling airflow path A are shown in FIG. 1. As those skilled in the art can appreciate, induction motors often incorporate a plurality of cooling vents and cooling airflow paths.

The present invention includes one or more noise damping ducts 30 each respectively having a proximal end opening 32 coupled to and in communication with one or more cooling vents 24 or 26 and a distal end opening 34 in communication with ambient air. As shown in FIG. 1 one duct 30 is coupled to one or more inlet cooling vents 24 and another duct 30 is coupled to one or more outlet cooling vents 26. A cooling airflow path A enters duct 30 coupled to the inlet cooling vent 24, where it transfers heat from the motor housing interior, in turn exits the outlet cooling vent 26 and thereafter is exhausted from duct 30. The ducts 30 of the present invention can be coupled to either or both of inlet cooling vents 24 or outlet cooling vents 26.

Figure 2:
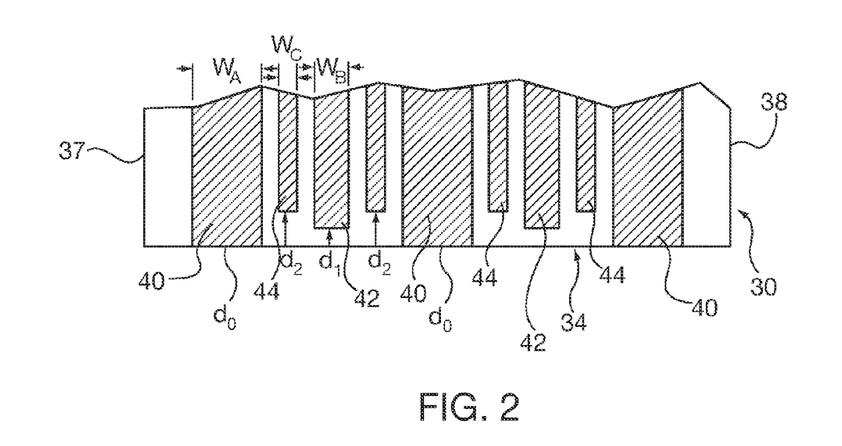
FIG. 2 is a sectional plan view of the duct of FIG. 1A taken along 2-2 thereof.

Referring to FIGS. 1, 1A and 2, duct 30 has a top wall 35, bottom wall 36 and side walls 37, 38 that form a passage for cooling airflow between its proximal 32 and distal 34 ends. The duct 30 supports a plurality of baffles 40, 42, 44 that oriented in an generally parallel mutually spaced array relative to each other and the duct cooling airflow path A. Dimensions for baffle array parallel spacing, baffle thickness and baffle inset from one or both of the proximal and distal openings are chosen to restrict distance between adjacent baffles to less than a wavelength of windage noise at selected propagation frequencies.

Figure 10:
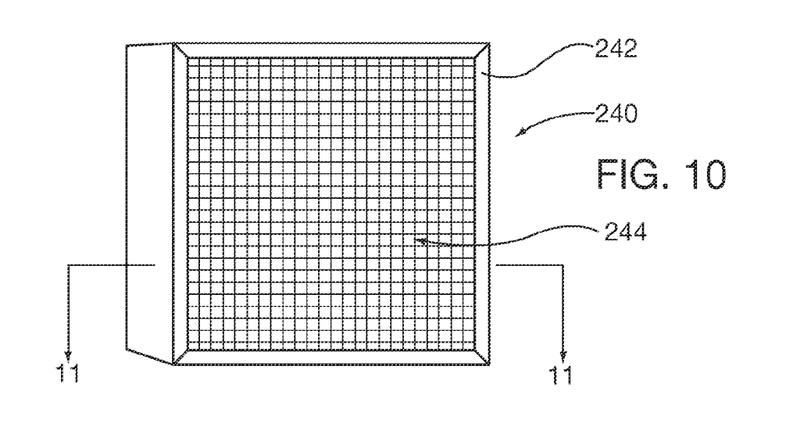
FIG. 10 is a perspective view of an exemplary baffle.
Figure 11:
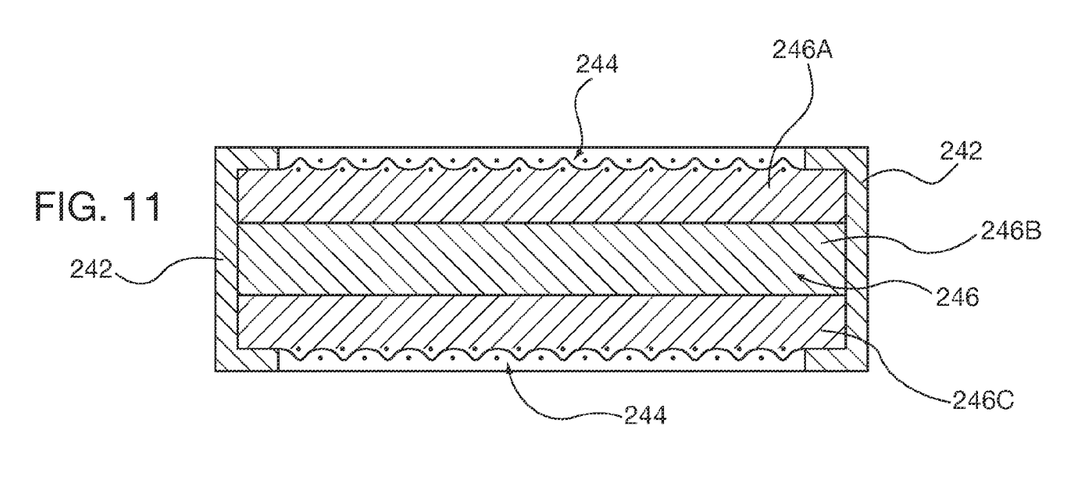
FIG. 11 is a sectional plan view of the baffle of FIG. 10 taken along 11-11 thereof.

In the embodiment of FIGS. 1, 1A and 2, a plurality of first baffles 40 are rectangular cross-section flat plates or fabricated thin wall boxes having a width or thickness $W_A$, that are inset dimension $d_0$ from the distal end 34 of duct 30. A plurality of second baffles 42 are also of rectangular cross-section, having a width or thickness $W_B$, that are inset dimension $d_1$ from the distal end 34 of duct 30. Similarly, a plurality of third baffles 44 are also of rectangular cross-section, having a width or thickness $W_C$, that are inset dimension $d_2$ from the distal end 34 of duct 30. Baffles 40, 42 and 44 are schematically depicted as boxes having a rectangular cross-section, and may be constructed as shown in FIGS. 10 and 11, described in greater detail herein. While in this symmetrical baffle array embodiment three widths of baffles are shown with lateral spacing relative to each other and varying insets from the duct 30 distal end, those skilled in the are may choose to construct ducts with symmetrical or asymmetrical arrays having less than or more than three baffle widths, and employing different patterns of inset and lateral spacing to meet the noise attenuation requirements of different motor designs and applications.

Figure 3:
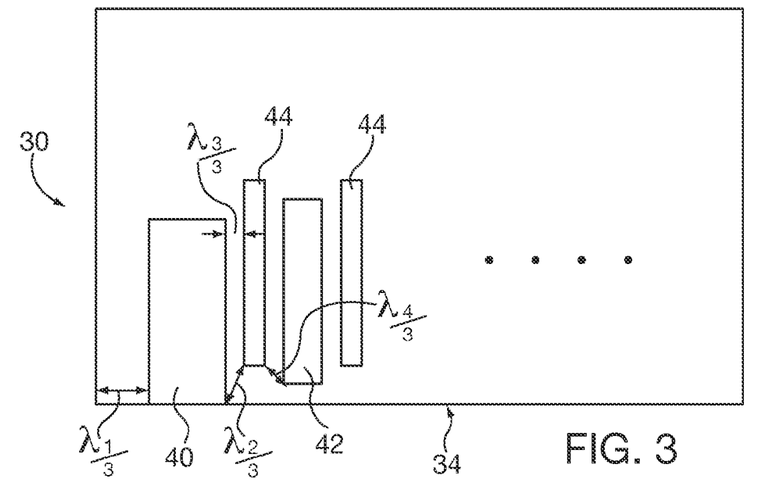
FIG. 3 is a sectional plan view of duct of FIG. 1A taken along 2-2 thereof, showing varied spacing between baffles selected to attenuate different noise frequency wavelengths $\lambda_{1-4}$.

The schematic view of FIG. 3 depicts how varying combinations of baffle 40, 42 and 44 lateral spacing, plate thickness/width and inset orientation effectively vary two dimensional air gap distance between adjacent baffles. In order to dampen or attenuate noise of a given frequency, it is desirable to set air gap distance between adjacent plates at no more than that frequency's corresponding wavelength λ, and preferably no more than λ/3. By way of example in order to dampen noise frequencies between 400 and 4000 Hz that are of particular interest for human hearing, corresponding wavelengths vary between 0.001-5.5 inches (0.028-140 mm). Baffles 40, 42, 44 may be constructed with width/thickness between 2-8 inches (50-200 mm). Baffle inset and lateral spacing is varied in the baffle array so that the two dimensional air gap distance between adjacent baffles varies between 0.5-5.5 inches (13-140 mm). Spacing at the wider distance between most of the adjacent baffles assures adequate cooling air flow A through the duct 30, for needed motor 20 cooling while attenuating lower frequency noise. Some of the baffles are spaced at more relatively narrower distances to attenuate higher frequency noise. As depicted in FIG. 3, the array of baffles 40, 42, 44 creates different two dimensional air gap distances $\lambda_1/3$, $\lambda_2/3$, $\lambda_3/3$ and $\lambda_4/3$, each capable of attenuating that corresponding wavelength/frequency as well as lower frequencies having longer wavelengths than the air gap distances.

The present invention allows one skilled in the art to custom tune noise damping frequencies for different constructions of motors and their applications. Tuning is accomplished easily by varying the baffle array orientation baffle width, lateral spacing and inset from one of the ends of the duct, in order to achieve desired two dimensional air gap spacing between adjacent baffles needed to attenuate a desired noise frequency/wavelength. Custom tuning may be accomplished by varying the duct 30 baffle 40, 42, 44 array during duct manufacture or in the field.

Figure 4:
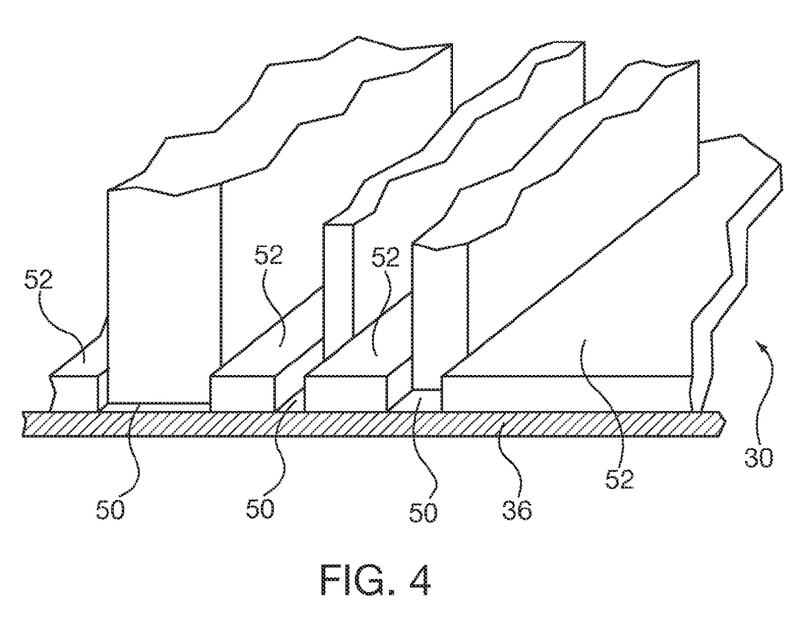
FIG. 4 is a cutaway perspective view of one embodiment of the noise attenuation system duct of the present invention for orienting baffles in a selected array through the use of spacer plates.
Figure 5:
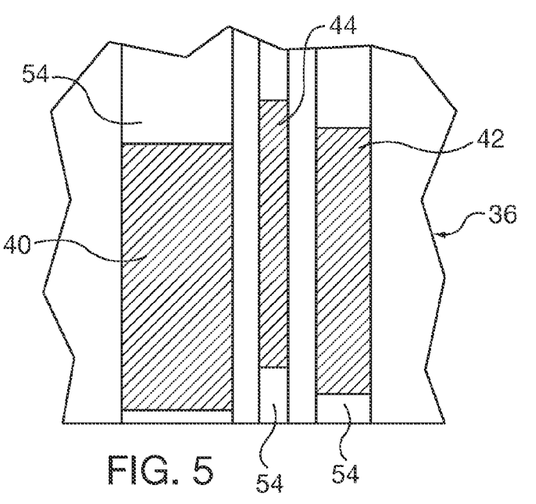
FIGS. 5 and 6 show an alternate embodiment for orienting baffles in a selected array through the use of formed corrugated channels formed in the duct.
Figure 6:
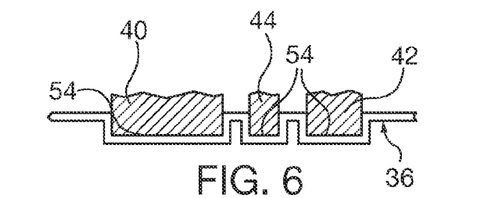
Figure 7:
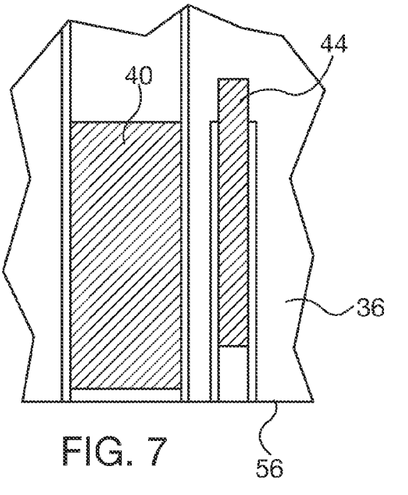
FIGS. 7 and 8 show an alternate embodiment for orienting baffles in a selected array through the use of fabricated C channels affixed within the duct.
Figure 8:
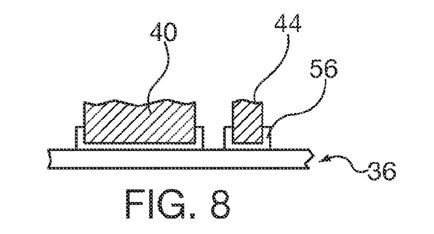

As shown in FIGS. 4-8, baffle arrays in the duct 30 may be varied through use of spaced baffle channels 50, 52, 54, 56. Baffles 40, 42, 44 are selectively oriented in the parallel baffle channels 50. Baffle inset can be varied by sliding the baffle to a desired inset position relative to the duct 30 proximal and/or distal end. If baffles have the same depth dimension between the duct proximal and distal ends, the array baffle inset on one end will have a mirror image baffle array inset on the other end. Baffle lateral spacing can be varied by placing them in desired parallel channels 50. In the embodiment of FIG. 4 baffle channels 50 are created by gaps between spacer plates 52 coupled to the duct bottom wall 36 and top wall (not shown). In the embodiment of FIGS. 5 and 6, baffle channels 54 are integrally formed in the duct 30 bottom wall 36 and top wall (not shown): for example a corrugated sheet metal stamping. In the embodiment of FIGS. 7 and 8 the baffle channels are C-shaped channels 56 that are affixed to the duct bottom wall 36 and the top wall (not shown). Once a baffle array is oriented the respective baffles can be coupled to the baffle channels through known affixation means, such as welding, fastening, friction interference fit and gluing.

Figure 9:
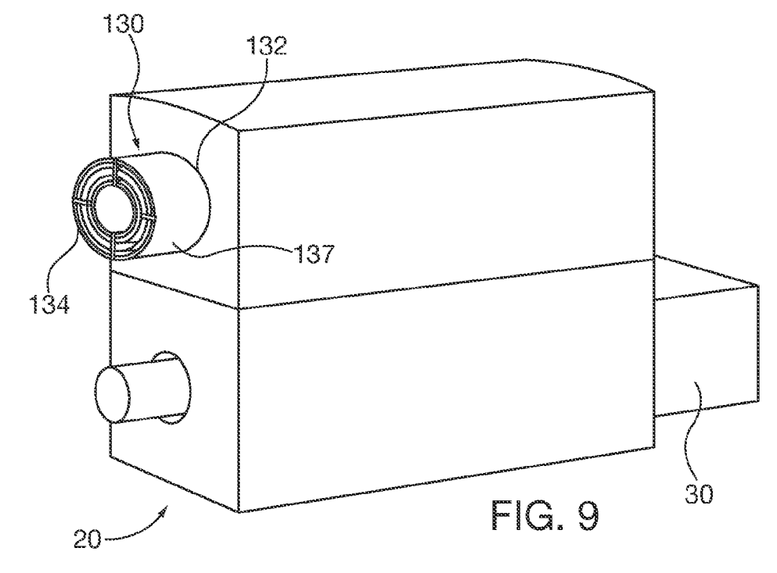
FIGS. 9 and 9A show in a schematic perspective view an alternate embodiment of the present invention using a circular baffle array having cylindrical baffles of different width, lateral spacing between cylindrical baffles and axial offset relative to the duct distal end.
Figure 9A:
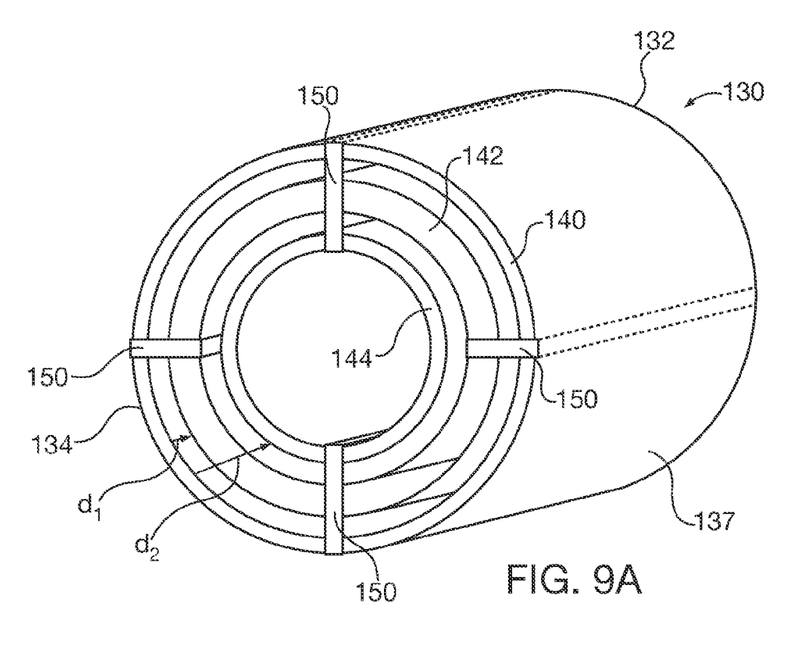

The duct 30 embodiments of FIGS. 1-8 have incorporated generally flat planar polygonal sides between the respective proximal and distal ends. The baffles 40, 42, 44 are generally rectangular cross-section fabrications in the form of flat planar plates or boxes having a plurality of thicknesses, the construction of which will be described in greater detail below. However, other duct shapes may be utilized. As shown in FIGS. 9 and 9A, the duct 130 has a generally cylindrical profile with a proximal end 132 coupled to a cooling vent and a distal end 134 in communication with ambient air. The duct 130 has a generally cylindrical side wall 137 having captured therein generally concentrically arrayed cylindrical baffles, 140, 142, 144 of generally annular cross-section, having different annular thicknesses. The baffles are retained in relative position by baffle spacers 150 that are affixed to the baffles. Baffles 140, 142, 144 may be radially spaced at selected distances and inset relative to the duct distal end 132, so as to achieve desired air gap distance between adjacent baffle. As was described with respect to the prior embodiments, baffle symmetry, thickness, spacing and axial inset dimensions may be varied at the discretion of one skilled in the art for particular applications.

FIGS. 10 and 11 show an exemplary fabricated baffle 240 embodiment that incorporates known sound damping resilient material such as sheet foam or injected self-expanding foam. Baffle 240 has a fabricated perimeter frame 242 that captures opposed sheets of screen 244 on the large sides of the box-shaped structure. Screen 244 provides additional structural integrity to the baffle 240 as well as shielding from potential impact damage that might be potentially caused by airborne debris. Captured within the baffle 240 perimeter frame 242 and screens 244 is a layer of sound damping foam material 246. As shown in FIG. 11 the foam 246 may comprise a plurality of layers of sheet foam 246A, 246B, and 246C, that may have distinct sound deadening properties, for example attenuation of different frequency ranges.

Although various embodiments which incorporate the teachings of the present invention have been shown and described in detail herein, those skilled in the art can readily devise many other varied embodiments that still incorporate these teachings.

What is claimed is:

1. An induction motor windage noise damping system, comprising:
a motor having a housing, a cooling vent formed in the housing, a rotating shaft and rotor within the housing generating windage noise, and a cooling airflow path defined within the housing that is in communication with the cooling vent;
a duct having proximal and distal ends defining respective openings and a duct airflow path there between, the proximal end opening in communication with the cooling vent and the distal end opening for communication with ambient air;
a plurality of first baffles in the duct;
a plurality of second baffles in the duct; and
wherein the first and second baffles are oriented in an generally parallel mutually spaced array relative to each other and the duct airflow path, and wherein dimensions for at least one of baffle array parallel spacing, baffle thickness or baffle inset from one of the duct openings differ between the first and second baffles, and said dimensions are adjusted to restrict distance between adjacent baffles to less than a wavelength of windage noise at selected propagation frequencies between 400 Hz and 4000 Hz.

2. The system of claim 1, wherein the baffle array has a repeating pattern.

3. The system of claim 1, wherein the first baffles have a first thickness; the second baffles have a second thickness; and dimensions for baffle array parallel spacing, baffle thickness and baffle inset from one of the duct openings are chosen to restrict distance between adjacent baffles to less than a wavelength of windage noise at selected propagation frequencies.

4. The system of claim 3, further comprising a plurality of third baffles in the duct having a third thickness, wherein the first, second and third baffles are oriented in an generally parallel mutually spaced array relative to each other and the duct airflow path, and wherein dimensions for baffle array parallel spacing, baffle thickness and baffle inset from one of the duct openings are chosen to restrict distance between adjacent baffles to less than a wavelength of windage noise at selected propagation frequencies.

5. The system of claim 1, further comprising a plurality of channels within the duct that are oriented in an generally parallel mutually spaced array relative to each other and the duct airflow path, wherein:
the baffles are engaged within the channels; and
baffles are selectively oriented relative to each other by selectively insetting the baffles within the channels relative to one of the openings.

6. The system of claim 5, wherein parallel spacing between adjacent baffles is selectively varied by engaging baffles in channels corresponding to a desired spacing distance.

7. The system of claim 6, wherein the duct channels are integrally formed therein.

8. The system of claim 6, wherein the duct channels comprise separate components that are affixed to the duct.

9. The system of claim 1, wherein the duct has generally flat planar polygonal sides between the respective proximal and distal ends and the baffles are generally box-shaped structures having resilient sound-absorbing material therein that is in communication with the cooling airflow path.

10. The system of claim 1, wherein the duct has a generally cylindrical side wall between the respective proximal and distal ends and the baffles are concentrically nested annular cylinders having a plurality of thicknesses.

11. A method for damping windage noise in an induction motor having a housing, a cooling vent formed in the housing, a rotating shaft and rotor within the housing generating windage noise, and a cooling airflow path defined within the housing that is in. communication with the cooling vent, the method comprising:
providing a duct having proximal and distal ends defining respective openings and a duct airflow path there between, the proximal end opening for coupling to an induction motor and communication with a cooling vent thereof, and the distal end opening for communication with ambient air;
providing a plurality of first baffles in the duct;
providing a plurality of second baffles in the duct; and
selectively orienting the first and second baffles in an generally parallel mutually spaced array relative to each other and the duct airflow path, wherein dimensions for at least one of baffle array parallel spacing, baffle thickness or baffle inset from one of the duct openings differ between the first and second baffles, and said dimensions are adjusted to restrict distance between adjacent baffles to less than a wavelength of windage noise at selected propagation frequencies between 400 Hz and 4000 Hz.

12. The method of claim 11, wherein the baffle array is oriented in a repeating pattern.

13. The method of claim 11, wherein the first baffles have a first thickness; the second baffles have a second thickness; and dimensions for baffle array parallel spacing, baffle thickness and baffle inset from one of the duct openings are chosen to restrict distance between adjacent baffles to less than a wavelength of windage noise at selected propagation frequencies.

14. The method of claim 13, further comprising providing a plurality of third baffles in the duct having a third thickness; and selectively orienting the first, second and third baffles in an generally parallel mutually spaced array relative to each other and the duct airflow path, wherein dimensions for baffle array parallel spacing, baffle thickness and baffle inset from one of the duct openings are chosen to restrict distance between adjacent baffles to less than a wavelength of windage noise at selected propagation frequencies.

15. The method of claim 11, further comprising:
providing a plurality of channels within the duct that are oriented in an generally parallel mutually spaced array relative to each other and the duct airflow path;
engaging the baffles within the channels; and
selectively insetting the baffles within the channels relative to one of the openings, thereby selectively orienting the baffles relative to each other.

16. The method of claim 15, further comprising selectively varying parallel spacing between adjacent baffles by engaging baffles in channels corresponding to a desired spacing distance.

17. The method of claim 16, wherein the duct channels are integrally formed therein.

18. The method of claim 16, wherein the duct channels comprise separate components that are affixed to the duct.

19. The method of claim 11, wherein the duct has generally flat planar polygonal sides between the respective proximal and distal ends and the baffles are generally box-shaped structures having resilient sound-absorbing material therein that is in communication with the cooling airflow path.

20. The method of claim 11, wherein the duct has a generally cylindrical side wall between the respective proximal and distal ends and the baffles are concentrically nested annular cylinders having a plurality of thicknesses.

21. A system for damping windage noise in an induction motor having a housing, a cooling vent formed in the housing, a rotating shaft and rotor within the housing generating windage noise, and a cooling airflow path defined within the housing that is in communication with the cooling vent, the system comprising:
a duct having proximal and distal ends defining respective openings and a duct airflow path there between, the proximal end opening adapted for coupling to an induction motor and communication with a cooling vent thereof, and the distal end opening for communication with ambient air;
a plurality of first baffles in the duct;
a plurality of second baffles in the duct; and
wherein the first and second baffles are oriented in an generally parallel mutually spaced array relative to each other and the duct airflow path, and wherein dimensions for at least one of baffle array parallel spacing, baffle thickness or baffle inset from one of the duct openings differ between the first and second baffles, and said dimensions are adjusted to restrict distance between adjacent baffles to less than a wavelength of windage noise at selected propagation frequencies between 400 Hz and 4000 Hz.

22. The system of claim 21, wherein the first baffles have a first thickness; the second baffles have a second thickness; and dimensions for baffle array parallel spacing, baffle thickness and baffle inset from one of the duct openings are chosen to restrict distance between adjacent baffles to less than a wavelength of windage noise at selected propagation frequencies.

* * * * *